2,795,575
AZO DYES

Robert Frederic Michel Sureau, Enghien-les-Bains, and Juliette Nicole Blum, Paris, France, assignors to Compagnie Francaise des Matieres Colorantes, Paris, France, a French company No Drawing. Application April 29, 1955,
Serial No. 505,061

Claims priority, application France April 30, 1954

2 Claims. (Cl. 260—146)

The present invention relates to a new mono-azo dyes of the following general formula as well as the metalliferous complexes derived therefrom:

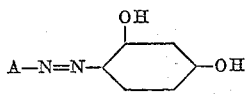

in which A represents the residue, after removal of the —NH₂ group, of a member of the group formed by 4-amino-indazole, 5-amino-indazole, 6-amino-indazole, 7-amino-indazole, the derivatives of these amino-indazoles halogenated at the 3-position and their derivatives substituted on the aromatic nucleus by substituents which do not confer solubility such as the halogen atoms and the alkyl, alkoxy, nitro, sulphonamido, and acylamino groups (the last named only being able to be present in the meta or para position to the azo radical). The metalliferous complexes thus defined may by used as coupling agents in the preparation of azo dyes.

These coupling agents are obtained by diazotisation of 4-, 5-, 6- or 7-amino-indazoles which may be substituted in the 3-position by a halogen atom and may possibly carry substituents on the aromatic nucleus which do not confer solubility, such as halogen atoms and alkyl, alkoxy, nitro, sulphonamido or acylamino groups (the last named group can only occur in the meta or para position to the amino group), coupling of the diazo derivatives thus obtained with resorcinol, and finally conversion of the mono-azo dyes resulting from the coupling process into metalliferous complexes.

Diazotisation of the amino-indazoles is a known operation; the coupling of the diazo derivatives with resorcinol is preferably carried out in an alkaline medium. For the conversion of the mono-azo dyes obtained from the diazo compounds of amino-indazoles, on the one hand, and resorcinol, on the other hand, into metalliferous complexes, these dyes are reacted with agents capable of giving up metals belonging to the group known as the transition group, having atomic weights of 51 to 65, of which the principal members are chromium, manganese, iron, nickel and copper; among the agents capable of giving up these metals may be mentioned the hydroxides, salts and complexes of the metals. The metallising process may take place by any of the known methods, at low temperature, at boiling point or in an autoclave under pressure; it may be effected in an aqueous medium or in the presence of organic solvents, in the absence or presence of mineral or organic bases, complexing agents, polyhydric alcohols, aliphatic hydroxy-acids (citric, tartaric, lactic, or glycolic acid) or aromatic hydroxy-acids (salicyclic acid or cresotic acids).

The metalliferous complexes of the azo dyes of the Formula I thus obtained generally have excellent solubility in a caustic alkaline medium. They are of particular interest for production on fibres of black and brown azo dyes which are insoluble in water.

Several proposals have already been made for the formation of black and brown azo dyes which are insoluble in water during printing on textile fibres, but each of these proposals has disadvantages. The known diazo derivatives, used with the coupling agents of the prior art, may be used with the new coupling agents; they are capable of coupling at least once and they couple twice when they have sufficient strength. Metalliferous dis- or tris-azo dyestuffs are thus formed on the fibre. With regard to the browns, for example, arylides of 2-hydroxycarbazole-3-carboxylic acid or 2-hydroxydiphenylene oxide-3-carboxylic acid and cupric complexes derived from benzene-azo-resorcinol have been used as coupling agents; as to the blacks, use has been made either of the arylides of 2-hydroxy-5:6:7:8-tetrahydronaphthalene-3-carboxylic acid or 2-hydroxy-naphthocarbazole-3-carboxylic acid or of the aminoazo compound obtained by coupling in an acid medium the diazo derivative of ortho-nitraniline with 1:7-aminonaphthol. But most of these coupling materials require long and difficult synthesis; the coupling agents for blacks do not lead to very deep blacks; the aminoazo compound mentioned above gives irregular results, chiefly on account of its sensitivity to reducing agents; and finally, the cupric complexes derived from benzene-azo-resorcinol give rise to a froth in the printing pastes.

It has now been found that the coupling agents of the present invention do not show these disadvantages; they can be mixed with nitrosamines or with diazoamino derivatives and thus provide preparations directly utilisable in printing. The nitrosamines and diazoamino derivatives are preferably selected from those which can be obtained from diazotizable bases which do not contain groups conferring solubility, but which may contain substituents such as halogen atoms and alkyl, alkoxy, aryloxy, nitro, sulphonamido, trifluoromethyl, acylamino or sulphone groups.

For printing fabrics by means of mixtures of the coupling materials according to the invention with the diazoamino derivatives mentioned above, the mixtures are made into a paste with a thickening agent in the presence of a mineral or organic base, the paste obtained is printed on the fabric and is dried and developed according to the usual techniques. Among these usual techniques may be mentioned acid steaming, which may be necessary if the amine stabilizer used for the preparation of the diazoamino derivative has not been suitably chosen; if, on the contrary, there is used for the preparation of the diazoamino derivative an amine stabiliser selected, for example, from those mentioned in the applications Serial Nos. 308,694 of September 9, 1952, 366,866 of July 8, 1953, now abandoned, 394,206 of November 24, 1953, now abandoned, and in the Patent No. 2,675,374, filed September 9, 1952, a simple neutral steaming is sufficient.

The coupling materials according to the invention thus furnish very full-bodied and very fast shades, generally blacks if they are derived from 7-amino-indazole and browns if they are derived from 4-, 5-, or 6-amino-indazoles; the printing pastes do not froth and their sensitivity to reducing agents is not too high.

When the derivatives of amino-indazoles are mentioned in the text these refer to the products whose formula is represented by the following numbering:

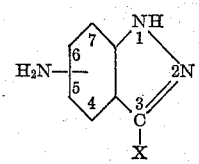

The invention will be more clearly understood by reference to the following examples which are purely illus-

Example 1

16.8 parts of 100% 4-chloro-7-amino-indazole are dissolved at elevated temperature in 40 parts by volume of concentrated hydrochloric acid and 1,000 parts of water. The filtered solution is cooled to 7° C. and mixed, with vigorous agitation and as quickly as possible, with 14 parts by volume of a 50% solution of sodium nitrite. After a quarter of an hour's stirring at 7–10° C., the mixture is filtered in order to separate a slight fluocculent impurity; the slight excess of nitrite is destroyed by the addition of a small amount of sulphamic acid and the diazo compound is introduced under the liquid into a solution of 12 parts of resorcinol in 350 parts by volume of a 2 N solution of sodium carbonate. An orange-brown precipitate is formed which is kept agitated for an hour. The mixture is heated for some minutes at a temperature near to boiling, filtered while hot, allowed to drain, then washed and dried at a moderate temperature. Weight obtained: 20 parts.

29 parts of the dye prepared above are dissolved at elevated temperature in 1,500 parts of water and 20 parts by volume of 10 N caustic soda. On the other hand, a mixture comprising the following components is prepared: 65 parts by volume of a solution of cobalt sulphate titrating 4.75% of cobalt, 60 parts by volume of a 4 N solution of tartaric acid, 35 parts by volume of 10 N caustic soda and 50 parts of water. This mixture is heated to 70° C. and and introduced into the solution of the dye with vigorous agitation. The metalliferous complex is rapidly formed. Heating under reflux is carried out for 10 minutes. A red-violet solution is obtained which no longer changes colour on paper with a drop of hydrochloric acid. The complex is precipitated by neutralisation with dilute hydrochloric acid, and is filtered and dried at 100° C. Weight obtained: 28 parts.

Example 2

15 parts of the cobalt complex prepared according to Example 1, 66 parts of the diazoamino derivative obtained by condensing, in an alkaline medium, the diazo derivative of 4-chloro-2-amino-toluene with N-(2:4-dichloro-6-carboxyphenyl)-glycine and which titrates 21.4% base of molecular weight 141.5, 17.5 parts by volume of 10 N caustic soda, 22.5 parts by volume of ethyl alcohol and 14 parts of water are intimately mixed until solution takes place.

400 parts of a thickener based on starch-tragacanth and 10 parts by volume of a 15% solution of sodium chromate are then added. This paste is sieved, printed upon cotton calico, dried in an oven at 60–70 C. and developed by exposure for 8 to 10 minutes to steam at 100° C. The material is rinsed, agitated for some minutes in a boiling bath containing, per litre, 2 parts of Marseilles soap and 2 parts of sodium carbonate. After rinsing and re-treating, a print of a deep black showing excellent general fastness is obtained. On the other hand, it should be noted that the printing paste thus prepared has very good stability when out of contact with light. After keeping for 6 days at ordinary temperature, the prints obtained have lost practically nothing in strength.

On replacing the diazoamino derivative used in this example by 48 parts of the diazoamino derivative obtained from 5-chloro-2-amino-toluene and N-(2-carboxyphenyl)glycine (titre 29.2% base), or by 50 parts of the diazoamino derivative obtained from 4-chloro-2-amino-anisole and N-(2-carboxyphenyl)glycine (titre 32% base), or by 85 parts of the diazoamino derivative obtained from dianisidine and N-(2-carboxyphenyl)glycine (titre 28.2% base), or by 51 parts of the diazoamino derivative obtained from 2-amino-4-dimethylsulphonamido-toluene and N-hydroxyethyl anthranilic acid (titre 43.6%), and observing the same method of application, black shades are obtained which are very close from the point of view of depth of tone and fastness.

Example 3

29 parts of the dye prepared according to the first paragraph of Example 1 are dissolved at elevated temperature in 1,500 parts of water and 20 parts by volume of 10 N caustic soda. To this solution is added a mixture, previously brought to boiling for a moment, which contains the following components: 46 parts by volume of a solution of chromium acetate (titre 20% as chromium sesquioxide), 120 parts by volume of a 4 N solution of tartaric acid, 72 parts by volume of 10 N caustic soda and 200 parts of water.

After heating for 4 hours under reflux, the violet solution no longer changes colour with a drop of hydrochloric acid on paper. The complex is precipitated by the addition of 60 parts by volume of concentrated hydrochloric acid, filtered, washed and dried at moderate temperature. Weight obtained: 37 parts.

Example 4

3.5 parts of the complex prepared according to Example 3 are intimately mixed until solution takes place with 9.8 parts of the diazoamino derivative obtained from 5-chloro-2-amino-toluene and N-(2-carboxyphenyl)glycine (titre 29.2% base), 5 parts by volume of 10 N caustic soda, 4.5 parts by volume of alcohol and 4 parts of water.

80 parts of a thickener based on starch-tragacanth are added and then 2 parts by volume of 15% sodium chromate solution, the homogeneous paste obtained is sieved, printed on cotton fabric, dried at 60–70° C. and developed by exposure for 8 to 10 minutes in neutral steam at 100° C. After rinsing, the material is treated for some minutes in a boiling bath containing, per litre, 2 parts of Marseilles soap and 2 parts of sodium carbonate, and is then rinsed and re-treated. An extremely deep black print is obtained, the whole having excellent fastness.

On replacing the diazoamino derivative used in this example by 13.4 parts of the diazoamino derivative obtained from 4-chloro-2-amino-toluene and N-(2:4-dichloro-6-carboxyphenyl)glycine (titre 21.4% base), or by 10.5 parts of the diazoamino derivative obtained from 4-chloro-2-amino-anisole and N-(2-carboxyphenyl) glycine (titre 32% base), or by 17 parts of the diazoamino derivative obtained from dianisidine and N-(2-carboxyphenyl)glycine (titre 28.2% base), or by 10.6 parts of the diazoamino derivative obtained from 2-amino-4-dimethylsulphonamidotoluene and N-hydroxyethyl-anthranilic acid (titre 43.6), black prints are obtained which are approximately equivalent from the point of view of shade and of fastness.

Example 5

13.3 parts of 6-aminoindazole are dissolved in 40 parts by volume of concentrated hydrochloric acid and 800 parts of water. The solution is cooled to 5° C. and diazotized by the rapid introduction of 14 parts by volume of a 50% solution of sodium nitrite. After stirring for 10 minutes, the excess of nitrite is destroyed by the addition of a small quantity of sulphamic acid, and the diazo derivative is introduced into a solution of 13 parts of resorcinol in 380 parts of a 2 N solution of sodium carbonate. The dye partially precipitates from the orange solution. Precipitation is completed by the addition of 42 parts by volume of 50% acetic acid, the mixture is filtered, briefly washed, drained and dried. Weight obtained: 25 parts.

25 parts of the dye prepared above are dissolved in 800 parts of water and 10 parts by volume of 10 N caustic soda. 98 parts by volume of a 12.5% solution of crystalline copper sulphate are introduced drop by drop with vigorous agitation. The copper complex is immediately precipitated. It is filtered, washed, drained and dried in the oven. Weight collected: 27 parts.

Example 6

A solution is made by mixing 5.7 parts of the copper complex described in Example 5 with 13.4 parts of the diazoamino derivative obtained from 4-chloro-2-aminotoluene and N-(2:4-dichloro-6-carboxyphenyl)glycine (titre 21.4% base), 5 parts by volume of 10 N caustic soda, 4.5 parts by volume of ethylglycol and 40 parts of water.

This solution is made into a paste with 80 parts of thickener based on starch-tragacanth and 2 parts by volume of a 15% solution of sodium chromate. This is sieved and printed on cotton calico, dried at 60–70° C., and developed by exposure to neutral steam at 100° C. for a period of 8 to 10 minutes. After rinsing and treatment in a boiling bath containing 2% of soap and 2% of sodium carbonate, a full-bodied red-brown shade possessed of excellent general fastness is obtained.

A very similar result is obtained on replacing the diazoamino derivative employed by the various diazoamino derivatives cited at the end of Examples 2 and 4. The printing pastes show very good stability away from bright light.

Example 7

25 parts of the dye prepared according to the first paragraph of Example 5 are dissolved in 800 parts of water and 10 parts by volume of 10 N caustic soda. 45 parts by volume of a solution of cobalt sulphate containing 6.6% of cobalt are introduced into this solution with vigorous stirring. The complex is partly precipitated. Its separation is completed by the addition of 8 parts of 5 N acetic acid. The complex is filtered, drained and dried at 100° C. Weight obtained: 25 parts.

Example 8

The copper complex in Example 6 is replaced by the same quantity of cobalt complex prepared according to Example 7, and the preparation of the paste and the rest of the operations are carried out as in Example 6. A brown print which is a little more yellowish than that with the copper complex is obtained which possesses good general fastness.

Example 9

A solution of 21 parts by volume of a solution of chromium acetate (titre 20% as chromium sesquioxide) and 110 parts by volume of a solution of N sodium salicylate brought to boiling and adjusted to a pH of 11, is mixed with a solution of 25 parts of the dye described in the first paragraph of Example 5 in 800 parts of water and 10 parts by volume of 10 N caustic soda. The mixture is heated under reflux for 5 hours. It is salted out while hot with 100 parts of salt and the precipitate is filtered. After drying, 22 parts of the chromium complex are obtained.

Example 10

In the preparation of the paste given in Example 6, the copper complex is replaced by 6.8 parts of the chromium complex described in Example 9, and the remainder of the operations are carried out as in Example 6. The shade produced is a full-bodied red-brown of good general fastness.

Example 11

On replacing the 6-amino-indazole in Example 5 by 14.7 parts of 4-amino-5-methyl-indazole and on finishing the preparation in the same manner, 26 parts of red-brown dye are obtained after drying.

27 parts of the dye prepared above are dissolved in 500 parts of water and 30 parts by volume of 10 N caustic soda. On the other hand, 65 parts by volume of a solution of cobalt sulphate containing 4.75% of cobalt are mixed with 60 parts by volume of 4 N tartaric acid and 35 parts of 10 N caustic soda. This solution is heated for some moments at boiling point and introduced into the well stirred solution of the dye. The complex is formed at once; it is salted out while hot by the addition of 100 parts of salt. The complex separates in the form of a brown precipitate which is very soluble in cold dilute soda.

Example 12

A mixture of 3 parts of the cobalt complex prepared according to Example 11 and 13.2 parts of the diazoamino derivative obtained from 4-chloro-3-aminotoluene and N-(2:4-dichloro-6-carboxyphenyl)glycine (titre 21.4% base) is dissolved in 5 parts by volume of 10 N caustic soda, 4.5 parts by volume of ethylglycol and 6 parts of water. The solution is intimately mixed with 80 parts of thickener based on starch-tragacanth and 2 parts by volume of a 15% solution of sodium chromate. This paste is sieved and printed on cotton calico. After drying, the fabric is placed for 8 to 10 minutes in neutral steam at 100° C., then treated for some minutes in a bath containing 2% of soap and 2% of sodium carbonate at the boiling point. The shade obtained is a yellow brown having good fastness.

Example 13

To a solution of dye prepared as described in the first paragraph of Example 11, there is added a mixture previously prepared from the following components by heating at boiling point for some moments: 46 parts by volume of a solution of chromium acetate (titre 20% as chromium sesquioxide), 120 parts by volume of a 4 N solution of tartaric acid, 72 parts by volume of N caustic soda and 200 parts of water.

The mixture is heated under reflux for 4 hours and the brown chromium complex formed is precipitated by 60 parts by volume of concentrated hydrochloric acid.

Example 14

On replacing the cobalt complex in Example 12 by 3.3 parts of the chromium complex prepared according to Example 13, and observing the same method of operation, a print of a khaki-brown more full-bodied than with the cobalt complex is obtained.

We claim:
1. A coupling component being a metalliferous complex of a mono-azo dye, the monoazo dye having the formula:

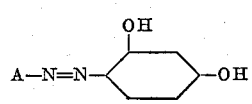

in which A represents the residue, after the removal of the —NH₂ group, of a member selected from the group consisting of 4-chloro-7-amino-indazole, 6-amino-indazole and 4-amino-5-methylindazole, the metal of the complex being a member selected from the group consisting of chromium, copper and cobalt.

2. A coupling component being a cobalt complex of the mono-azo dye corresponding to the formula:

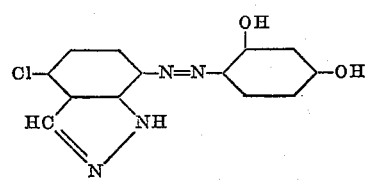

References Cited in the file of this patent
UNITED STATES PATENTS

| | | |
|---|---|---|
| 1,193,829 | Schule | Aug. 8, 1916 |
| 2,308,023 | Peterson | Jan. 12, 1943 |
| 2,315,220 | Petitcolas et al. | Mar. 30, 1943 |
| 2,671,775 | Hanhart | Mar. 9, 1954 |
| 2,675,374 | Petitcolas et al. | Apr. 13, 1954 |

FOREIGN PATENTS

| | | |
|---|---|---|
| 599,834 | Great Britain | Mar. 22, 1948 |
| 632,595 | Great Britain | Nov. 28, 1949 |